United States Patent [19]
Brendel

[11] 4,181,011
[45] Jan. 1, 1980

[54] LOAD CELL
[75] Inventor: Albert E. Brendel, Lake Orion, Mich.
[73] Assignee: Maatschappij van Berkel's Patent N.V., Rotterdam, Netherlands
[21] Appl. No.: 904,978
[22] Filed: May 11, 1978
[51] Int. Cl.² .............................................. C01L 1/22
[52] U.S. Cl. ................................................. 73/141 A
[58] Field of Search ...................... 73/141 A, 720, 726; 338/5

[56] References Cited
U.S. PATENT DOCUMENTS

| | | |
|---|---|---|
| 2,866,059 | 12/1958 | Laimins . |
| 3,004,231 | 10/1961 | Laimins . |
| 3,184,964 | 5/1965 | Hedrick et al. ............... 73/141 A |
| 3,341,796 | 9/1967 | Eisele ........................ 73/141 A X |
| 3,363,456 | 1/1968 | Laimins . |
| 3,439,761 | 4/1969 | Laimins . |
| 3,486,369 | 12/1969 | Korzilius ................... 73/141 A X |
| 3,512,595 | 5/1970 | Laimins . |
| 3,554,025 | 1/1971 | Andersson et al. . |
| 3,576,128 | 4/1971 | Lockery . |
| 3,577,779 | 5/1971 | Laimins . |
| 3,805,604 | 4/1974 | Ormond . |
| 3,858,143 | 12/1974 | Schaberg .................... 73/141 A X |

Primary Examiner—Charles A. Ruehl
Attorney, Agent, or Firm—Lloyd L. Zickert

[57] ABSTRACT

A strain gage load cell for measurement of weight or other forces. The load cell includes opposite and relatively massive end constraints, a pair of stabilizer flexures connected between opposite end constraints in a parallelogram type frame, a sensing beam with a first end supported by one of the end constraints, and a load directing flexure between the other end constraint and a second end of the sensing beam. The load directing flexure intersects the midpoint of the sensing beam and causes equal tensile and compressive stresses along a common surface of the beam upon which the strain gages are mounted.

13 Claims, 10 Drawing Figures

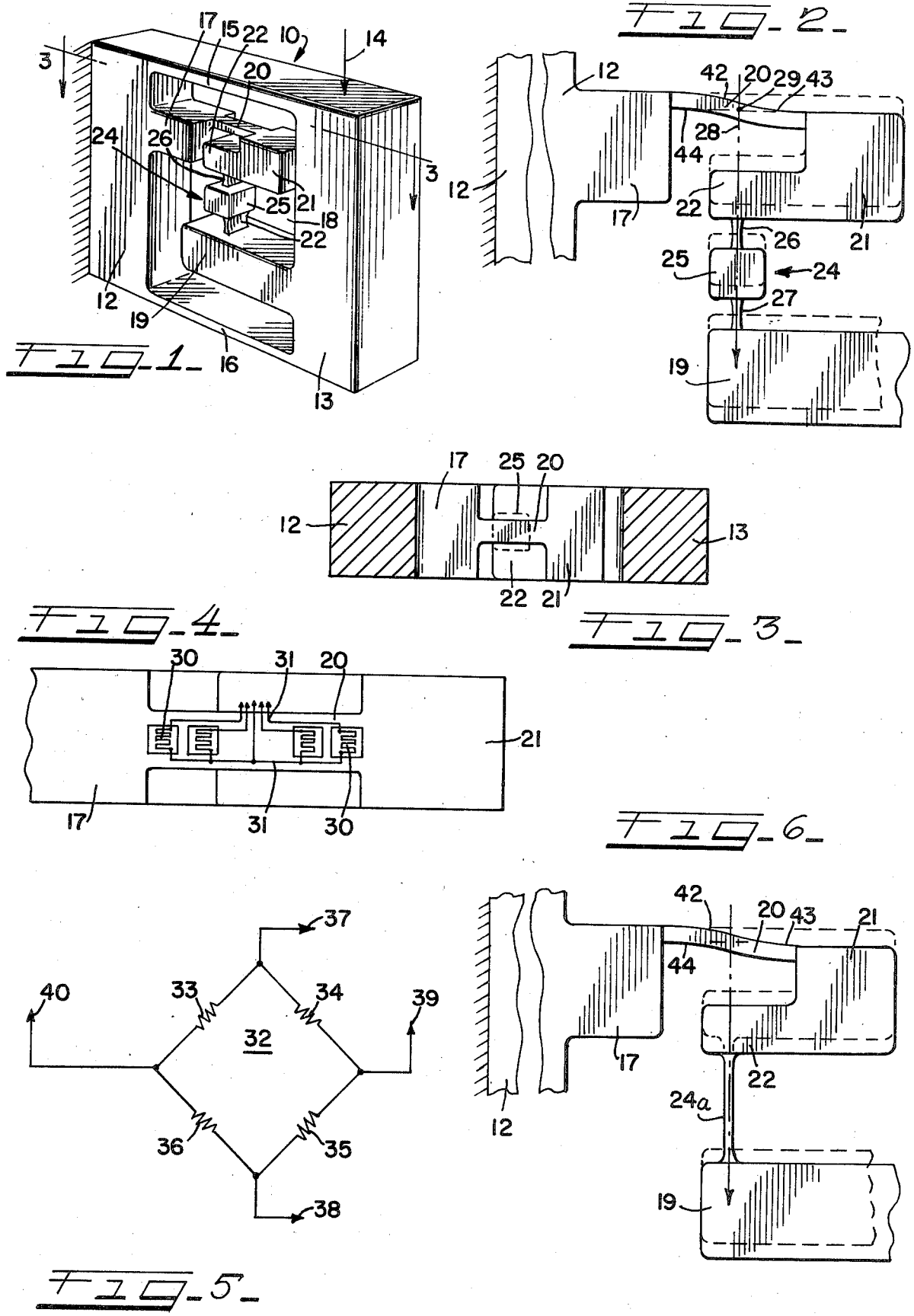

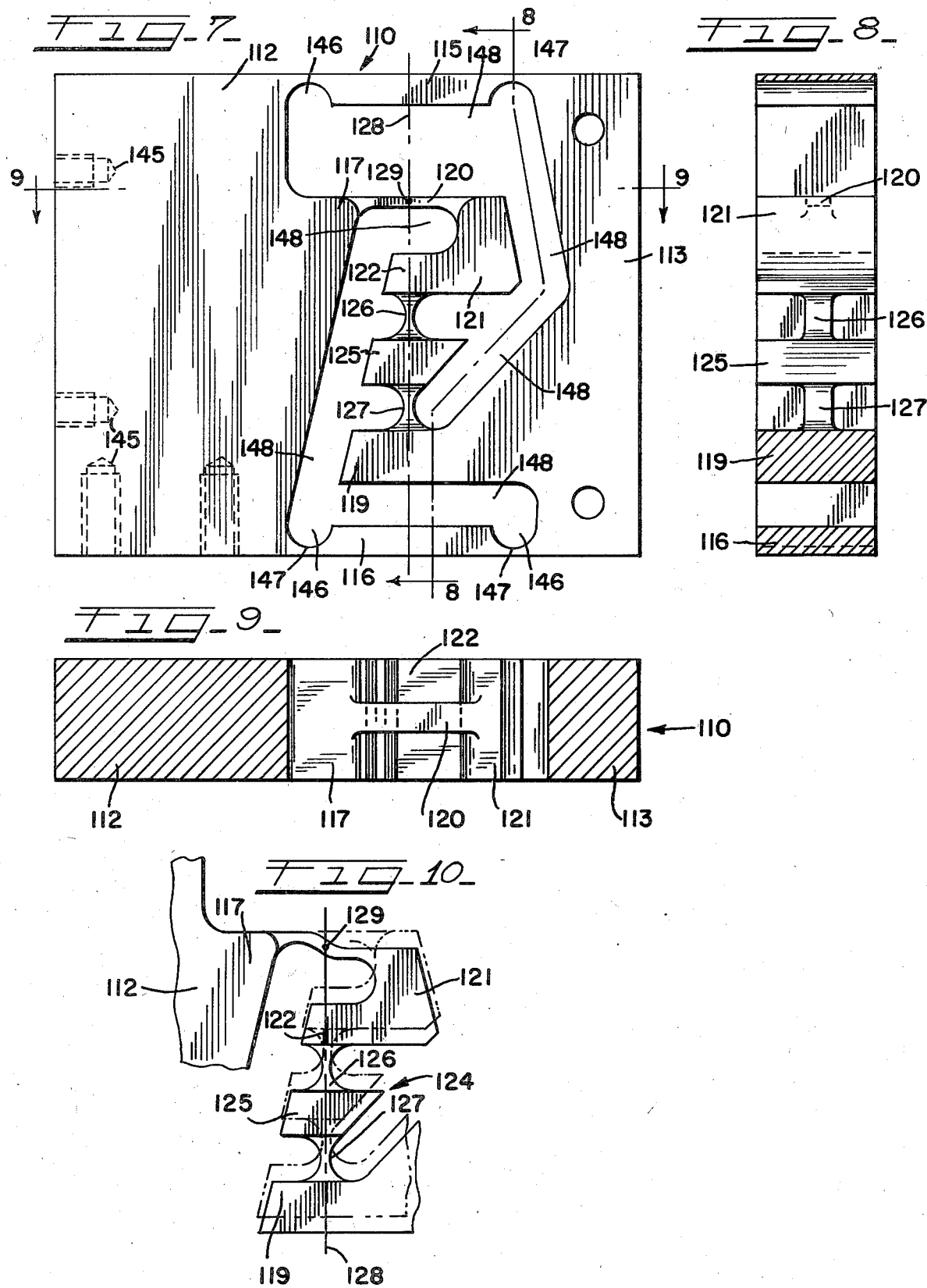

LOAD CELL

This invention relates in general to a load cell for measuring weight or forces by means of strain gages, and more particularly to a load cell of the parallelogram type which avoids any axial loading of the sensing beam and causes a common surface of the sensing beam to be placed in equal tensile and compressive stresses by means of a load directing flexure which intersects the midpoint of the sensing beam.

Numerous types of load cells are known to the prior art, including some of the parallelogram type. Many previous designs of the parallelogram type have elements, including a sensing beam, which are rigidly fixed at both ends in order to obtain equal clockwise and counterclockwise moments in the sensing beam. Such designs, coupled with a parallelogram stabilizer system, resulted in a load cell which had two of the parallelogram stabilizers and the sensing beam in parallel. This resulted in a statically indeterminate system in which internal axial forces, such as those caused by machining or fabrication stresses or temperature gradients, caused end loading effects on the sensing beam. The end loading effects degrade the performance of the load cell or make compensation of these forces extremely difficult to handle.

Other prior art designs have utilized a free sensing beam, but have failed to produce equal clockwise and counterclockwise moments in the sensing beam because the load directing flexural element did not intersect the beam at the midpoint thereof. Instead, these prior art designs loaded the beam as a simple cantilever. Individual strain gage elements must be used in cantilever loading techniques. Such techniques also result in a sensing beam system which is extremely sensitive to strain gage location and which does not adequately reject or compensate for those extraneous forces which are not fully eliminated by the stabilizer flexures or the load directing flexure.

Some other prior art load cells eliminate the sensing beam and the load directing flexure by utilizing the stabilizer flexures of the parallelogram for sensing the load. While this technique is relatively inexpensive, the stabilizer flexure is placed in either tension or compression by any load applied to the load cell. To compensate for the tension or compression it is usually necessary to apply strain gages to both the upper and lower stabilizer flexures in order to eliminate the axial loading effects which otherwise contribute significant error to the stresses applied by the load. The stress levels in such a design reach extremely high values because strain gages typically require relatively high stress levels for usable signal levels and extraneous loads further add to the already high stresses.

A principal object of the present invention is therefore to provide a load cell for use in conjunction with strain gages in which axial loading of the sensing beam is avoided, thereby minimizing any error in moments created by loads normal to the sensing beam, such as the measured load.

A related object is to provide a load cell having a common surface of the sensing beam with equal tensile and compressive stresses in response to the measured load such that multiple element strain gages may be applied to the sensing beam by repeatable photographic processes, rather than attempting to control strain gage placement and spacing by manual installation techniques.

Another object is to provide a load cell with relatively massive end constraints which function as rigid members for directing the force to be measured to the sensing beam while remaining substantially unaffected by extraneous forces. Typical extraneous forces, which the end constraints should be independent of, include those encountered in mounting the load cell to the weighing apparatus, or in deforming under the influence of other extraneous loads which may be present, but are not desired as measured quantities.

Yet another object is to provide a load cell with a load directing flexure which is disposed along the midpoint of the sensing beam with at least two flexure points in the load directing flexure for further elimination of any extraneous forces and for avoiding axial loading of the sensing beam.

A further object is to provide a load cell having the sensing beam system separated from the stabilizer system whereby the desired force to be measured can be obtained from a single element.

A still further object is in the provision of a load cell that may be fine adjusted to separate the extraneous forces from the desired force.

A further object is to provide a load cell in accordance with the above objects which may be easily and efficiently manufactured by numerically controlled machine techniques.

The load cell of the present invention provides superior performance characteristics with better accuracy, linearity and off-center load capabilities, without any sacrifice in economy or ease of manufacture. A pair of relatively massive end constraints are interconnected by stabilizer flexure means in a parallelogram manner. One of the end constraints is suited for mounting to weighing apparatus or the like and the load or force to be measured is applied to the other end constraint to cause limited flexing in the stabilizer flexure means in response to the load. A sensing beam is generally parallel to the stabilizer flexures with one end of the beam rigidly connected to one of the end constraints. The other end of the beam terminates in an enlarged portion extending parallel to and under the beam. Load directing flexure means is disposed below a midpoint of the sensing beam between the enlarged portion of the sensing beam and the other end constraint. The load directing flexure means eliminates any extraneous forces and avoids application of any axial loads to the sensing beam.

Any load applied to one of the end constraints results in proportional flexing of the stabilizer flexures and the sensing beam. The sensing beam is placed in equal tensile and compressive stresses along a common surface of the beam. The equal tensile and compressive stresses are indicative of both clockwise and counterclockwise moments present in the beam in the well known shear gage configuration such that the output signal from strain gages placed on the beam is proportional only to the shear force in the beam and independent of the point of force application. These advantages further reject or eliminate any error resulting from extraneous forces which are not otherwise eliminated by the stabilizer flexures or the load directing flexure and contribute to even greater measurement accuracy, linearity and off-center load capability of the load cell.

Despite the positional relationships among the various elements of the load cell, economy and ease of manufacture are not sacrificed. In its preferred embodiment, the load cell of the present invention may be manufactured by simple milling and drilling processes on numerically controlled machinery.

Various other objects, features and advantages of the invention will become apparent from the following detailed disclosure taken in conjunction with the drawings.

In the drawings:

FIG. 1 is a perspective view of a simplified load cell embodying the present invention;

FIG. 2 is an enlarged partial side elevational view of the load cell of FIG. 1 illustrating in an exaggerated manner the movement of the interior portion of the load cell in response to a load;

FIG. 3 is a transverse sectional view taken substantially along line 3—3 of FIG. 1 to illustrate a top plan view of the sensing beam and associated components;

FIG. 4 is an enlarged view of the sensing beam of FIG. 3, further illustrating placement of multiple element resistive strain gages, and wiring therefor, on the sensing beam;

FIG. 5 is a schematic diagram of a Wheatstone bridge circuit for measuring changes in the resistive strain gages of FIG. 4 due to stresses in the sensing beam;

FIG. 6 is a greatly enlarged side elevational view of the interior portion of a modified load cell according to the invention having a thin load directing flexure;

FIG. 7 is a side elevational view of an embodiment of the load cell which is suitable for manufacture by numerically controlled machinery;

FIG. 8 is a generally vertical sectional view of the load cell of FIG. 7 taken substantially along line 8—8 thereof;

FIG. 9 is a transverse sectional view of the load cell of FIG. 7 taken substantially along line 9—9 thereof; and FIG. 10 is an enlarged side elevational view of the interior portion of the load cell of FIG. 7 illustrating in an exaggerated manner the response of the interior portion of the load cell to an applied load.

There is shown in FIGS. 1, 2 and 3 a simplified embodiment of a load cell, generally designated 10. A first end constraint or base 12 is adapted to be secured or mounted in a stationary manner. A second and opposite end constraint 13 has a force or weight which is to be measured applied to the top surface thereof, as at the downwardly directed arrow 14. An upper stabilizer flexure 15 and a lower stabilizer flexure 16 are connected to the first and second end constraints 12, 13 to define a parallelogram stabilizer flexure system. It is recognized that a square or rectangular frame is one form of a parallelogram. The first end constraint 12 has an enlarged fingerlike horizontal projection 17 extending inwardly into the window area 18 of the parallelogram. Similarly, the second end constraint 13 has an enlarged horizontal fingerlike projection 19 extending inwardly into the window area 18 of the load cell 10, but the horizontal projection 19 is vertically displaced from the horizontal projection 17.

A sensing beam 20 is rigidly attached at one end to the projection 17 of the first end constraint 12 and the other end of the sensing beam 20 terminates in an enlarged beam end constraint 21. The beam end constraint 21 is of "L" shape with a leg 22 extending horizontally under a portion of the sensing beam 20.

A load directing flexure element, generally designated 24, includes an enlarged center portion 25 between a pair of neck portions 26, 27. The load directing flexure 24 is disposed along a vertical centerline 28 which intersects the midpoint 29 between the ends of the sensing beam 20. The significance of this arrangement will be more fully appreciated at a later point. The load directing flexure 24 also interconnects the projection 19 of the second end constraint 13 to the leg 22 of the enlarged beam end portion 21.

The first end constraint 12 and the second end constraint 13 must be sufficiently massive to function as rigid members in directing forces in the load cell 10 to the other elements thereof. The end constraints 12, 13 have cross-sectional areas at least several times the cross-sectional areas of the stabilizer flexures 15, 16 for greater rigidity. The constraints 12, 13 must also be sufficiently rigid to prevent deformation under the influence of other extraneous loads which may be present but are not desired as measured loads.

The upper stabilizer flexure 15 and the lower stabilizer flexure 16 should be compliant to the measured load at the downwardly directed arrow 14 while at the same time absorbing substantially all extraneous forces to prevent them from being applied to the sensing beam 20. Thus, substantially only the measured load is transmitted to the sensing beam. These conditions are best satisfied, as in the present invention, where the sensing beam 20 is separated from the stabilizer flexures 15, 16. A further requirement of the stabilizer flexures 15, 16 is that the relative compliance of the flexures 15, 16 to that of the sensing beam 20 should not change in order to obtain repeatable stresses in the sensing beam 20 for identical loads. The above requirements are partially satisifed by a parallelogram beam system in which the stabilizer flexures 15, 16 are relatively long and flat and are spaced apart, but parallel, with each end of the stabilizer flexures 15, 16 fixed to relatively massive end constraints 12, 13.

In optimizing the performance of a parallelogram system, several important design considerations relating to the stabilizer flexures 15, 16 merit attention. To achieve high compliance in the measured load direction, the stabilizer flexures 15, 16 should be made relatively long and thin because compliance is a function of both the square of the stabilizer flexure thickness and the cube of the stabilizer flexure length. However, in order to obtain maximum stiffness to bending moments normal to the measured load direction, the cross-sectional area of the stabilizer flexures 15, 16 should be made as large as practical, and the distance between the stabilizer flexures 15, 16 should be made as large as possible. It is important to maintain relatively low stress levels in the stabilizer flexures 15, 16 to avoid failure or loss of repeatable load measuring performance in the load cell 10. Torque or moment about the measured load direction requires maximizing the cross-sectional areas of the stabilizer flexures 15, 16 and also providing as great a width for the stabilizer flexures 15, 16 as is practical in order to increase the lateral stiffness thereof. The lateral stiffness is a function of the square of the width of the stabilizer flexures 15, 16. End forces normal to the measured load and side forces which induce shear stresses in the stabilizer flexures 15, 16 both require a large cross-sectional area in the stabilizer flexures 15, 16.

The behavior of the load directing flexure 24 is opposite to that of the stabilizer flexures 15, 16. The load directing flexure 24 applies the load to be measured to the leg 22 of the beam end constraint 21 and hence, to the beam 20. The load directing flexure 24 must also be compliant to those forces which are not to be measured, i.e., those components of forces normal to the measured load direction. To this end, the pair of necks 26, 27 which interconnect the projection 19 of the second end constraint 13 to the leg 22 of the beam end constraint 21 provide a pair of flex or pivot points in the load directing flexure 24 such that the flexure 24 is compliant to forces normal to the measured load direction. FIG. 6 illustrates another embodiment of a load directing flexure 24a which is continuously thin between the projection 19 and the leg 22. The flexure 24a therefore has a number of points therealong in which the flexure 24a may be compliant to forces normal to the measured load direction. The flexure 24a transmits forces in the measured load direction between the projection 19 and the leg 22, similar to the flexure 24 of FIGS. 1-2.

The sensing beam 20 is one of the most important elements in the load cell 10. Tensile or compressive stresses in the sensing beam 20 are related and proportional to the measured load. A plurality of strain gages 30 (FIG. 4) may be affixed to one surface of the sensing beam 20. The beam sections where the gages are applied should be substantially parallel to the stabilizer flexures, and more importantly, perpendicular to the measured force axis. Preferably, the strain gages 30 are of the multiple element type with the critical dimensions of the strain gages 30 accurately controlled by repeatable photographic processes by a strain gage manufacturer. Much greater accuracy is attained from a multiple element strain gage 30 than by attempting to control the strain gage placement and spacing by manually installing a plurality of individual strain gages. Electrically conductive leads 31 from the strain gages 30 are preferably brought to the middle or center of the sensing beam 20 in routing the leads 31 to a Wheatstone bridge 32 (FIG. 5). This central location of the leads 31 on the sensing beam 20 minimizes any interference with the response of the strain gages 30 since the center of the sensing beam 20 ideally encounters zero stress even under application of a load to the load cell 10.

The Wheatstone bridge 32 of FIG. 5 includes resistors 33, 34, 35, 36 arranged in a bridge configuration. The resistors 33, 34, 35, 36 have resistance ratios such that the terminals 37, 38 connecting to an electric potential measuring device (not shown) will commonly exhibit a zero or null potential therebetween. A voltage or current source (not shown) is applied between a pair of terminals 39, 40. The resistances of the strain gages 30 are usually used as one or more of the resistors 33, 34, 35, 36 of the bridge 32. As the resistance in the strain gage 30 changes due to changes in tensile or compressive stresses in the sensing beam 20, the change in the associated resistor 33, 34, 35, 36 will cause an imbalance in the bridge 32 and therefore a non-zero potential between the measurement terminals 37, 38. The non-zero potential is related in magnitude to the load applied to the load cell 10.

Because the sensing beam 20 is rigidly constrained at each end thereof by the projection 17 and the beam end constraint 21 and because the load directing flexure 24 loads the sensing beam 20 along a midpoint 29 of the sensing beam 20, load applied to the load cell 10 will cause deflection in the sensing beam 20 as illustrated in an exaggerated manner in FIGS. 2 and 6. Since the load directing flexure 24 is offset from the end of the sensing beam 20 and is connected by the beam end constraint 21, the sensing beam 20 will have a bending moment applied to the beam end constraint 21, as well as a force representative of the load to be measured. The sensing beam 20 is thereby placed in the desired shear configuration. A portion of the top surface 42 of the sensing beam 20 between the midpoint 29 and the projection 17 is thereby placed in tension while another portion of the top surface 43 of the sensing beam 20 between the midpoint 29 and the beam end constraint 21 is placed in compression. Intermediate the top surfaces 42, 43, near the midpoint 29, will be a point at which there is no stress in the sensing beam 20. The sensing beam 20 has equal clockwise and counterclockwise moments present therein in the well known shear configuration. Under such conditions, the output signal from the strain gages 30 will be proportional to the shear stresses in the sensing beam 20, independent of the point of force application. The shear configuration further adds to the performance of the load cell 10 by rejecting the influences of any extraneous forces which are not effectively eliminated by the stabilizer flexures 15, 16 or by the load directing flexure 24.

As previously noted, the top surfaces 42, 43 of the sensing beam 20 have regions of equal tensile and compressive stresses. When utilized in conjunction with a multiple element strain gage 30, the areas of equal tensile and compressive stresses aid in preventing the introduction of any measurement nonlinearities into the Wheatstone bridge 32, maximize the output signal which may be obtained from the strain gages 30, and cancel first order temperature effects upon the load cell 10 because of the summing properties of the Wheatstone bridge 32.

Separation of the sensing beam 20 from the stabilizing flexures 15, 16, along with the other element relationships previously discussed, renders the sensing beam 20 completely free of any axially imposed forces. This is one of the desired objectives of the invention because strain gages are sensitive to the moments applied to or carried by the beam at the mounting location of the strain gages 30. Axial forces change the moment created by the measured load normal to the sensing beam 20 thereby causing resultant error in the resistive response of the strain gages 30. Separation of the sensing beam 20 from the stabilizers flexures 15, 16 also results in concentration of the measured load in a single element, i.e., the sensing beam 20, rather than in several elements where all of the elements must be provided with strain gages 30, or other suitable transducer, to accurately measure the load. A single element to which the load is directed or concentrated eliminates additional potential sampling errors which are peculiar to each sampled element.

With the functions of the various elements of the load cell 10 presented, the overall operation of the load cell 10 may now be considered. With reference to FIG. 1, a load to be measured is applied, as at the downwardly directed arrow 14, and is transmitted by the rigid end constraint 13 to cause flexing in the compliant stabilizer flexures 15, 16. The force of the load is also transmitted by the rigid end constraint 13 to the load directing flexure 24 through the projection 19. In accordance with the functions of these components as previously discussed, that component of the applied load which coincides with the centerline 26 of the load cell 10 is transmitted by the load directing flexure 24 and the beam end constraint 21 to the sensing beam 20 to cause a related degree of flexing of the sensing beam 20 to the flexing of the stabilizing flexures 15, 16. All other components of the applied force of the load are transmitted to the end constraint 12, effectively bypassing the sensing beam 20. The desired force component of the load which is transmitted to the sensing beam 20 produces equal clockwise and counterclockwise bending moments in the beam 20 due to the axis of the load directing flexure 24 intersecting the midpoint 29 of the sensing beam 20. These two moments produce equal tensile and compressive stresses on the top surface 42, 43 of the sensing beam 20. It will be readily appreciated by those skilled in the art that the lower surface 44 of the sensing beam 20 will also be placed in equal, but opposite, conditions of stress. That is, while the top surface 42 of the sensing beam 20 is in a tensile stress, the lower surface 44 of the sensing beam 20 directly below the top surface 42 will be in compressive stress. Since a common surface of the sensing beam 20 will be placed in equal tensile and compressive stresses, a multiple element strain gage 30 may be used to advantage and easily applied to the relatively accessible top surface of the sensing beam. Such a multiple element gage is easier and more economical to manufacture than a plurality of individual strain elements. Further, assembly on the beam is simplified.

Further fine adjustment or calibration of the load cell 10 to separate the desired load force from the extraneous forces may be accomplished by adjusting the relative compliances of either stabilizer flexures 15, 16, the load directing flexure 24, or both. A number of effects can degrade the accuracy of the load cell 10, including manufacturing tolerances, strain gage positioning errors, material non-homogenities, and electrical circuit interactions which may desensitive one or more of the strain gages 30. The fine adjustment or calibration is performed by selectively modifying the cross-sectional shape of the ends of the stabilizer flexures 15, 16 by physically removing material therefrom to change the localized flexural characteristics of the flexures 15, 16 to produce the desired force component separation.

A specific embodiment of the invention is illustrated in FIGS. 7, 8, 9 and 10. While many of the elements of the load cell 110 of FIGS. 7-10 differ in shape from the corresponding elements of the simplified embodiment of the load cell 10 in FIGS. 1-3, the relationships between the elements in the load cell 110 and the operation and advantages thereof are retained and are similar to the load cell 10. In particular, axial loading of the sensing beam 120 is avoided, the sensing beam 120 is placed in equal tensile and compressive strains along a common surface thereof in response to a measured load, the load cell 110 is provided with relatively massive end constraints 112, 113 with compliant stabilizer flexures 115, 116 therebetween, and a load directing flexure 124 is disposed substantially along a vertical centerline of the sensing beam 120 which intersects at a midpoint 129 thereof.

Some structural differences between the load cell 10 and the load cell 110 are readily apparent. Unlike the horizontally extending fingerlike projection 17 in the load cell 10, the projection 117 in the load cell 110 is an integral portion of the first end constraint 112 for increased rigidity in supporting the sensing beam 120. The end constraint 112 is also of greater mass to minimize any effects caused by mounting of the load cell 110 at threaded bores 145. The projection 119 of the second end constraint 113 is also of greater mass for increased rigidity. Each of the ends of the stabilizer flexures 115, 116 are provided with semicircular fillets 146 to more accurately define the flexing of the stabilizer flexures 115, 116. The fillets 146 are each located equi-distant from the centerline 128. Flexing of the stabilizing flexures 115, 116 occurs substantially at the flex points 147 which are at the narrowest points of the stabilizer flexures 115, 116.

The load cell 110 may be easily, efficiently and economically manufactured by providing the load cell 110 with a plurality of grooves 148. The grooves 148 may be created by a numerically controlled machine which mills said grooves 148 thereby leaving and also creating many of the elements of the load cell 110. The fillets 146 are preferably provided by drilling circular holes transversely through the load cell 110 prior to milling the grooves 148. Drilling operations, rather than milling, are preferred for making the fillets 146 since a greater degree of tolerance for the width of the flex point 147 can ordinarily be obtained by drilling. Further finishing operations may be required to obtain accurate tolerances for some of the other components, especially for the sensing beam 120.

The load cell 110 is fabricated from a single block of metal. A high quality piece of metal which will provide linear and repeated stress characteristics, especially in the sensing beam 120 and the stabilizing flexures 115, 116, is required. Such materials having the required operating linear stress/strain characteristics are readily available and include high strength aluminum alloys and heat treatable steel alloys. One such material is 2024 aluminum.

Load cells built in accordance with the present invention achieve unusually high accuracies, especially for commercial applications. Typically, the load cell 110 can achieve accuracies of better than 0.01 percent of full scale capacity.

Load cells will typically be used in scales having a weight capacity in the range of 5 lbs to 200 lbs.

It will be understood that various changes and modifications may be made without departing from the spirit of the invention as defined in the following claims, and equivalents thereof.

The invention is hereby claimed as follows:

1. A unitary load cell for measuring forces applied thereto, said load cell comprising:
   first end constraint means;
   second end constraint means;
   stabilizer flexure means including upper and lower flexures connected between said first and second end constraints to form a parallelogram, said first and second end constraints being relatively massive in relation to said stabilizer flexure means, said stabilizer flexure means permitting relative motion between said first end constraint and said second end constraint in response to a load applied in the sensing direction;
   a sensing beam with a first end thereof supported by the first end constraint at a point between said flexures;
   load directing flexure means between said second end constraint and a second end of said sensing beam for applying equal tensile and compressive stresses along a common surface of said sensing beam while avoiding any axial loading of said sensing beam, said load directing flexure means being disposed along a centerline which intersects said sensing beam near a midpoint thereof; and
   means for sensing said stresses in said sensing beam, said means for sensing stresses in said beam including a multiple element resistive strain gage mounted on a top surface of said sensing beam for responding to tensile and compressive strains in said sensing beam by variation in resistance in said strain gages.

2. The load cell defined in claim 1, wherein said stabilizer flexure means includes a plurality of parallel stabilizer flexures connected at their ends to said first and second end constraints.

3. The load cell defined in claim 2, wherein said centerline along which said load directing flexure means is disposed and which intersects a midpoint of said sensing beam is equi-distant from the ends of said stabilizer flexures.

4. The load cell defined in claim 2, wherein said stabilizer flexures include a plurality of fillets near their ends which define narrow flex points for said stabilizer flexures, said fillets being equi-distant from said centerline.

5. The load cell defined in claim 2, wherein said sensing beam is essentially parallel to said stabilizer flexures.

6. The load cell defined in claim 1, which further comprises an enlarged sensing beam end constraint at one end of said sensing beam, said sensing beam end constraint having a leg thereof underlying said sensing beam which permits the load directing flexure means connected between the leg of said sensing beam end constraint and said second end constraint to apply a bending moment, as well as a force representative of the measured force, to the end of the sensing beam.

7. The load cell defined in claim 1, wherein said load directing flexure means comprises at least two neck portions for compliantly rejecting any extraneous forces normal to the applied load direction, while transmitting the applied load to the sensing beam.

8. The load cell as defined in claim 1, wherein said load directing flexure means is disposed along a centerline which extends perpendicular to said sensing beam and which intersects a midpoint of said beam.

9. A load cell comprising spaced apart first and second end constraints, a pair of spaced apart parallel stabilizer flexures connected to their ends to the end constraints to form a parallelogram, a stress sensing beam extending parallel to said stabilizer flexures and having a first end supported by one of the end constraints at a point between said stabilizer flexures and a second end, and load directing flexure means extending between the other of said end constraints and said second end of said sensing beam including an enlarged sensing beam end constraint having a leg underlying at least half of the sensing beam and a load directing flexure depending from said leg along a centerline extending perpendicular to and intersecting the midpoint of said sensing beam the lower end of which is connected to a projection extending from the other of said end constraints.

10. A load cell as defined in claim 9, wherein said first end constraint is fixed and said second end constraint is movable and the load to be measured is applied to said second end constraint, and said sensing beam is supported by said fixed end constraint.

11. A load cell as defined in claim 10, wherein said centerline intersects the midpoints of said stabilizer flexures.

12. A load cell as defined in claim 11, wherein said load directing flexure means includes a plurality of flex points.

13. A load cell for measuring forces applied thereto, said load cell comprising:
first end constraint means;
second end constraint means;
stabilizer flexure means connected between said first and second end constraints to form a parallelogram, said first and second end constraints being relatively massive in relation to said stabilizer flexure means, said stabilizer flexure means permitting relative motion between said first end constraint and said second end constraint in response to a load applied to the sensing direction;
a sensing beam with a first end thereof supported by the first end constraint at a point between said stabilizer flexure means;
load directing flexure means between said second end constraint and a second end of said sensing beam for applying equal tensile and compressive stresses along a common surface of said sensing beam while avoiding any axial loading of said sensing beam, said load directing flexure means being disposed along a centerline which intersects said sensing beam near a midpoint thereof, said load directing flexure means including an enlarged center portion between a pair of neck portions;
an enlarged sensing beam end constraint at one end of said sensing beam, said sensing beam end constraint having a leg thereof underlying said sensing beam which permits the load directing flexure means connected between the leg of said sensing beam end constraint and said second end constraint to apply a bending moment, as well as a force representative of the measured force, to the end of the sensing beam; and
means for sensing said stresses in said sensing beam.

* * * * *

UNITED STATES PATENT AND TRADEMARK OFFICE
CERTIFICATE OF CORRECTION

PATENT NO. : 4,181,011
DATED : January 1, 1980
INVENTOR(S) : Albert E. Brendel

It is certified that error appears in the above—identified patent and that said Letters Patent are hereby corrected as shown below:

Col. 5, line 68, change "to" to --by--;
    Col. 7, line 32, change "desensitive" to --desensitize--; and
    Col. 9, line 40, change the first occurrence of "to" to --at--.

Signed and Sealed this

Twenty-fifth Day of March 1980

[SEAL]

Attest:

SIDNEY A. DIAMOND

*Attesting Officer*    *Commissioner of Patents and Trademarks*